United States Patent [19]
Vijgen et al.

[11] Patent Number: 5,088,665
[45] Date of Patent: Feb. 18, 1992

[54] SERRATED TRAILING EDGES FOR IMPROVING LIFT AND DRAG CHARACTERISTICS OF LIFTING SURFACES

[75] Inventors: Paul M. H. W. Vijgen; Floyd G. Howard, both of Hampton; Dennis M. Bushnell, Wicomico; Bruce J. Holmes, Newport News, all of Va.

[73] Assignee: The United States of America as represented by the Administrator of the National Aeronautics and Space Administration, Washington, D.C.

[21] Appl. No.: 429,516

[22] Filed: Oct. 31, 1989

[51] Int. Cl.⁵ ............................................. B64C 21/10
[52] U.S. Cl. .................................. 244/200; 244/198; 244/212; 244/215
[58] Field of Search ............... 244/198, 200, 212, 215

[56] References Cited

U.S. PATENT DOCUMENTS 2,800,291  7/1957  Stephens ........................... 244/200
2,950,879  8/1960  Smith ................................. 244/198
4,067,518  1/1978  Paterson et al. .................... 244/200

FOREIGN PATENT DOCUMENTS 420325   2/1924   Fed. Rep. of Germany ...... 244/200
696392   12/1930  France .............................. 244/200
794841   2/1936   France .............................. 244/200
104114   2/1917   United Kingdom ............... 244/200
329783   5/1930   United Kingdom ............... 244/204

Primary Examiner—Joseph F. Peters, Jr.
Assistant Examiner—Anne E. Bidwell
Attorney, Agent, or Firm—Kevin B. Osborne

[57] ABSTRACT

An improvement in the lift and drag characteristics of a lifting surface is achieved by attaching a serrated panel to the trailing edge of the lifting surface. The serrations may have a saw-tooth configuration, with a 60° included angle between adjacent serrations. The serrations may vary in shape and size over the span-wise length of the lifting surface, and may be positioned at fixed or adjustable deflections relative to the chord of the lifting surface.

19 Claims, 9 Drawing Sheets

SERRATED TRAILING EDGES FOR IMPROVING LIFT AND DRAG CHARACTERISTICS OF LIFTING SURFACES

ORIGIN OF THE INVENTION

The invention described herein was jointly made in the performance of work under a NASA contract and employees of the United States Government. In accordance with 35 U.S.C. §202, the contractor elected not to retain title.

BACKGROUND OF THE INVENTION

1. Field of the Invention

The present invention relates generally to the field of aerodynamics and, more specifically, to a structure for reducing drag and increasing lift on aerodynamic or on hydrodynamic surfaces with sharp or moderately blunt trailing edges.

2. Description of the Related Art

Typically, aerodynamic and/or hydrodynamic surfaces have sharp or moderately blunt trailing edges from which the wake is shed. The strength, distribution and direction of wake turbulence separation, and vorticity, and the location of the beginning of the wake are sources of increased drag and reduced lift, both of which are highly undesirable.

Generally, trailing edge devices which have been used to increase lift either have no effect on drag or have a negative effect on drag, and thus, trade-offs between lift and drag are normally expected. No trailing edge devices are currently known in the art which passively provide both drag reduction and lift improvement for with sharp or moderately blunt trailing edges. One attampt to reduce the base drag of wings with very thick, blunt trailing edges wherein the trailing edge has a thickness of more than five to ten percent of the wing chord has been to provide the trailing edge with span-wise indentations or splitter blades. In another device, a rippled trailing edge has been used to increase maximum lift by delaying the onset of massive boundary layer separation over very thick airfoils where the wing thickness is 20% of the wing chord and where low Reynolds numbers are experienced (about 100,000 based on the wing chord and the freestream velocity). However, neither approach simultaneously increased lift and reduced drag.

Another trailing edge device is known as the Gurney flap, and is illustrated generically on the trailing edge of an airfoil illustrated schematically in FIG. 1. The Gurney flap mounted perpendicularly to the chord, has been used to increase maximum lifting capability of airfoils. However, the two dimensional span-wise invariant Gurney flap does not modify the trailing-edge flow in a spanwise-periodic fashion, and thus does not alter the three-dimensional vorticity field in the region near and immediately behind the trailing edge. Also, the Gurney flap does not reduce drag for a given amount of lift.

None of the above-described devices have been proven to improve lift while decreasing drag associated with aerodynamically sharp trailing edges or trailing edges with moderate bluntness. Although the rippled trailing edge and the Gurney flap produced an increase in maximum lift, it concomitantly produced an undesirable drag penalty at cruise and climb conditions. Thus, a continuing need exists for devices which can produce increased lift while not increasing drag.

SUMMARY OF THE INVENTION

An object of the present invention is to provide an aerodynamic structure which improves the lift and drag characteristics of lifting surfaces.

Another object of the present invention is to provide passive control of vorticity, turbulence, and separation shed locally from the trailing edges of lifting surfaces.

Another object of the present invention is to provide a device which alters the strength, distribution, direction, and the location of the beginning fo wake which is a source of increased drag and of reduced lift, thereby improving the drag and lift characteristics of a lifting surface.

These and other objects of the invention are met by providing an apparatus for improving lift and drag characteristics of a lifting surface having a span, a leading edge, a trailing edge, and a chord, in which the apparatus includes a serrated panel having a plurality of span-wise, periodic indentations, and means for connecting the serrated panel to the trailing edge of the lifting surface. Preferably, the indentations form a plurality of saw teeth having 60° included angles between adjacent vertices, but other shapes of the indentations are possible.

In another aspect of the invention, a lift generating member includes a leading edge, a trailing edge, a lifting surface between the leading edge and the trailing edge, and a plurality of serrations formed at the trailing edge. Preferably, the serrations are substantially coplanar with a chord connecting the leading edge and the trailing edge. Alternately, the serrated panel may be hinged at the wing trailing edge to provide deflection capability for maximum performance.

In another aspect of the present invention, an apparatus for improving lift and drag characteristics of a main lifting surface having a span, a wing-flap trailing edge, and a flap-slot trailing edge, includes a first serrated panel having a plurality of span-wise, periodic indentations, first connecting means for connecting the first serrated panel to the wing-flap trailing edge, a second serrated panel having a plurality of span-wise, periodic indentations, and second connecting means for connecting the second serrated panel to the flap-slot trailing edge. The flap could also be located ahead of the main lifting surface.

These objects, together with other objects and advantages which will be subsequentially apparent reside in the details of construction and operation of the serrated panels attachable to trailing edges for improving lift and drag characteristics of lifting surfaces as more fully hereinafter describing claimed, reference being and to the accompanying drawings forming a part hereof, wherein like reference numerals refer to like parts throughout.

DETAILED DESCRIPTION OF THE PREFERRED EMBODIMENTS

Figure 1:
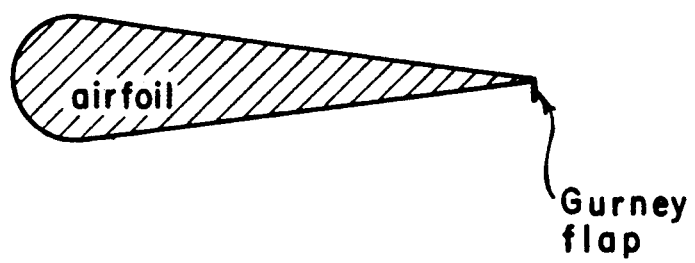
FIG. 1 is a schematic view of a Gurney flap on the trailing edge of an airfoil.
Figure 2:
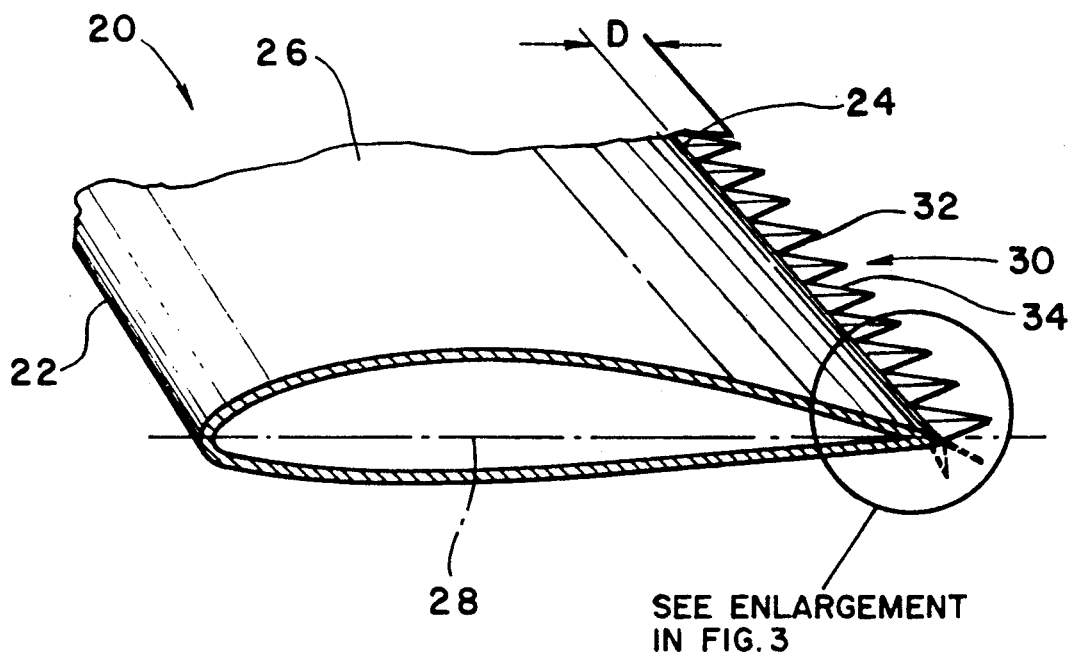
FIG. 2 is a schematic, cross-sectional view of a first preferred embodiment of the present invention.
Figure 3:
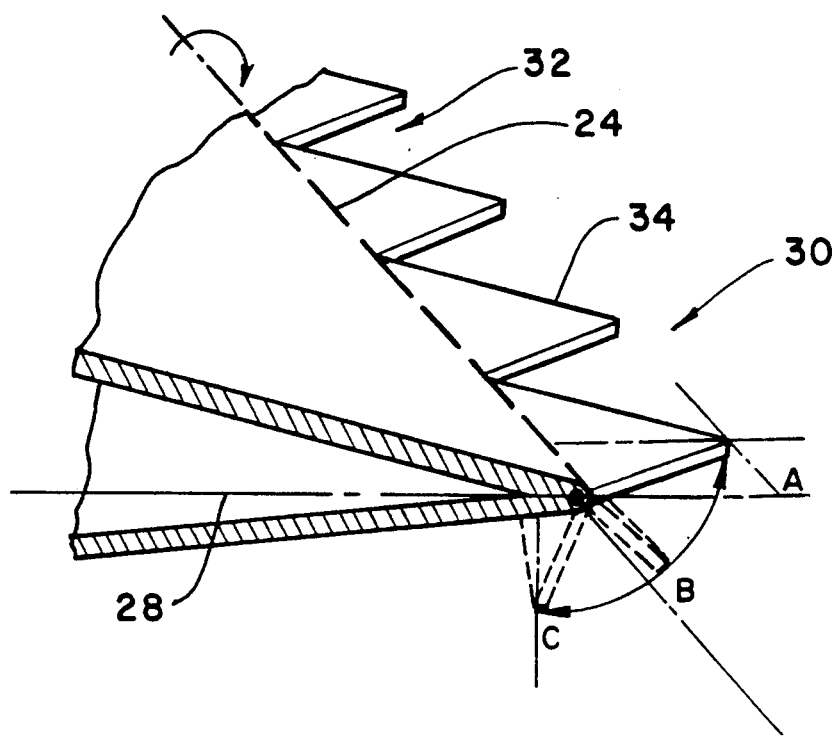
FIG. 3 is an enlarged view of the encircled portion of FIG. 2.
Figure 13:
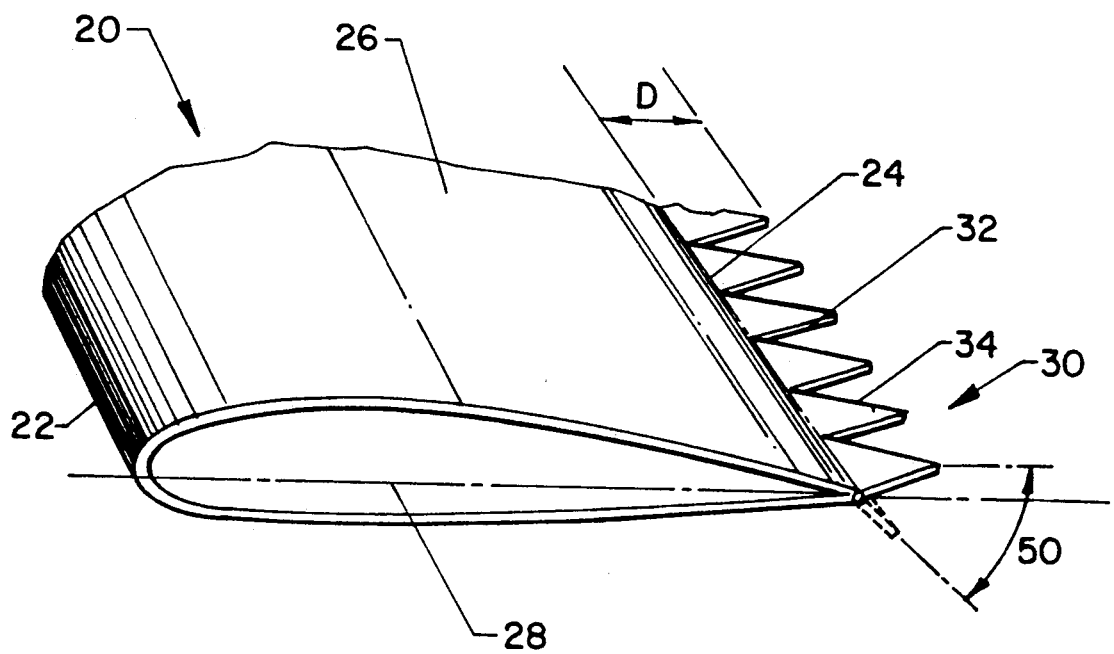
FIG. 13 is ea schematic, cross-sectional view of a fourth preferred embodiment of the present invention.

Although the preferred embodiments of the present invention are described hereinafter with reference to an airfoil, the principles apply to any aerodynamic or hydrodynamic lifting surface with sharp or moderately blunt trailing edges, such as a wing, empennage, flap, propeller blade, fan blade etc. Referring to FIGS. 2, 3 and 13 and airfoil 20, such as a wing, has a length referred to as a span, and includes a leading edge 22, a trailing edge 24, and a lifting surface 26 between the leading edge and the trailing edge. A chord 28 is an imaginary line drawn between the leading edge 22 and the trailing edge 24.

A serrated panel 30 has a plurality of span-wise periodic indentations 32 which form a plurality of serrations 34. The serrations are preferably of a saw-tooth configuration in which the included angle between adjacent teeth is preferably 60°, but other shapes are possible. The panel 30 is connected to the trailing edge 24 by any suitable connecting means. For example, a hinge may be formed along the length of the panel, such as a piano hinge. Other pivotal connection means may be provided. Also, the connection may be fixed with no pivotal action provided. See FIGS. 2 and 3. When the connection is fixed, angle 50, the angle formed by serrated panel 30 and chord 28, is between 0 and 90 degrees. See FIG. 13.

The serrated panel 30, when attached to trailing edge 24 by a pivotal connection, has a range of movement of substantially 90°, and is adjustably positioned so that in the position illustrated in FIGS. 2 and 3, and designed position "A" the panel 30 is coplanar with the chord 28. This position is set when the airfoil is used at low angles of attack and achieves drag reduction. In the position "B" the panel is deflected relative to the chord 28 at an angle greater than 0 and lesss than 90°, for increasing lift and decreasing drag at relatively low to moderate angles of attack. Finally, in position "C", the panel 30 is deflected penpendicularly downward relative to the chord 28 for maximum lift. Any conventional actuator can be used to set the position of the panel 30, such as push-pull cables, hydraulic controls, etc.

Figure 14:
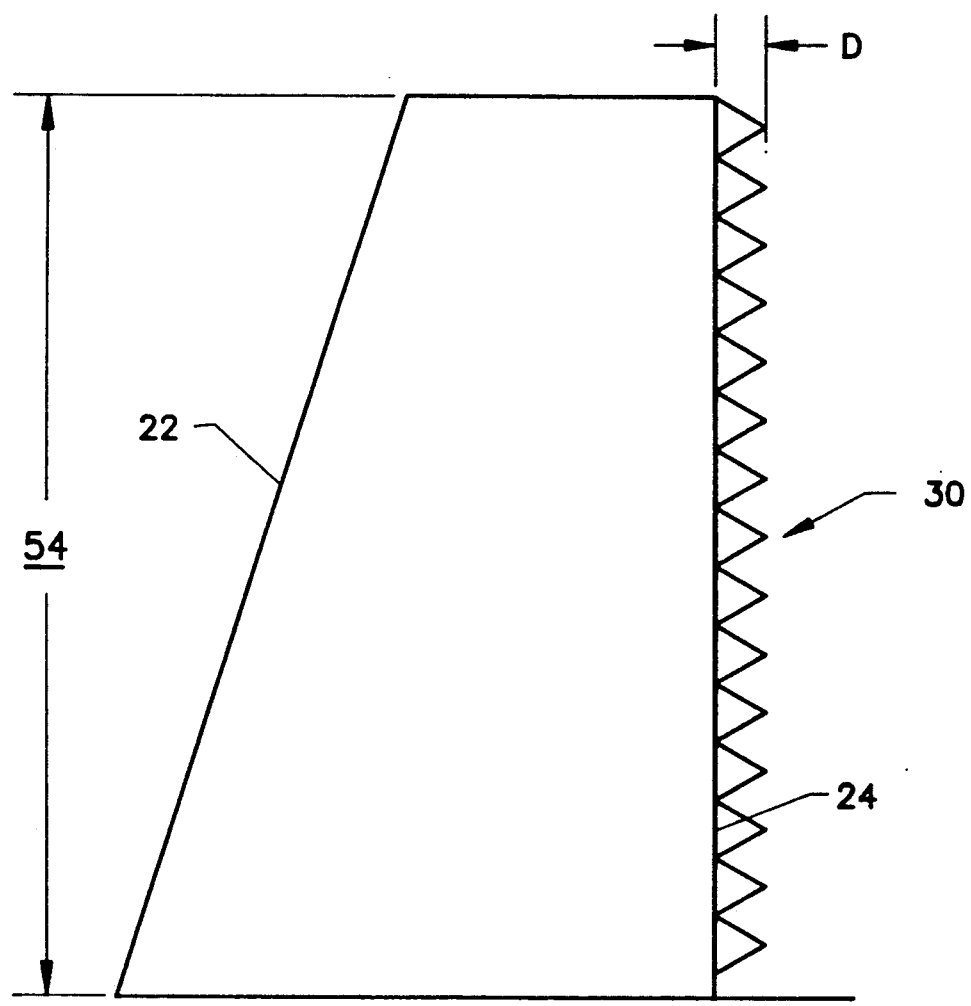
FIG. 14 is a view of the wing with serrations extending the full span of the wing.
Figure 15:
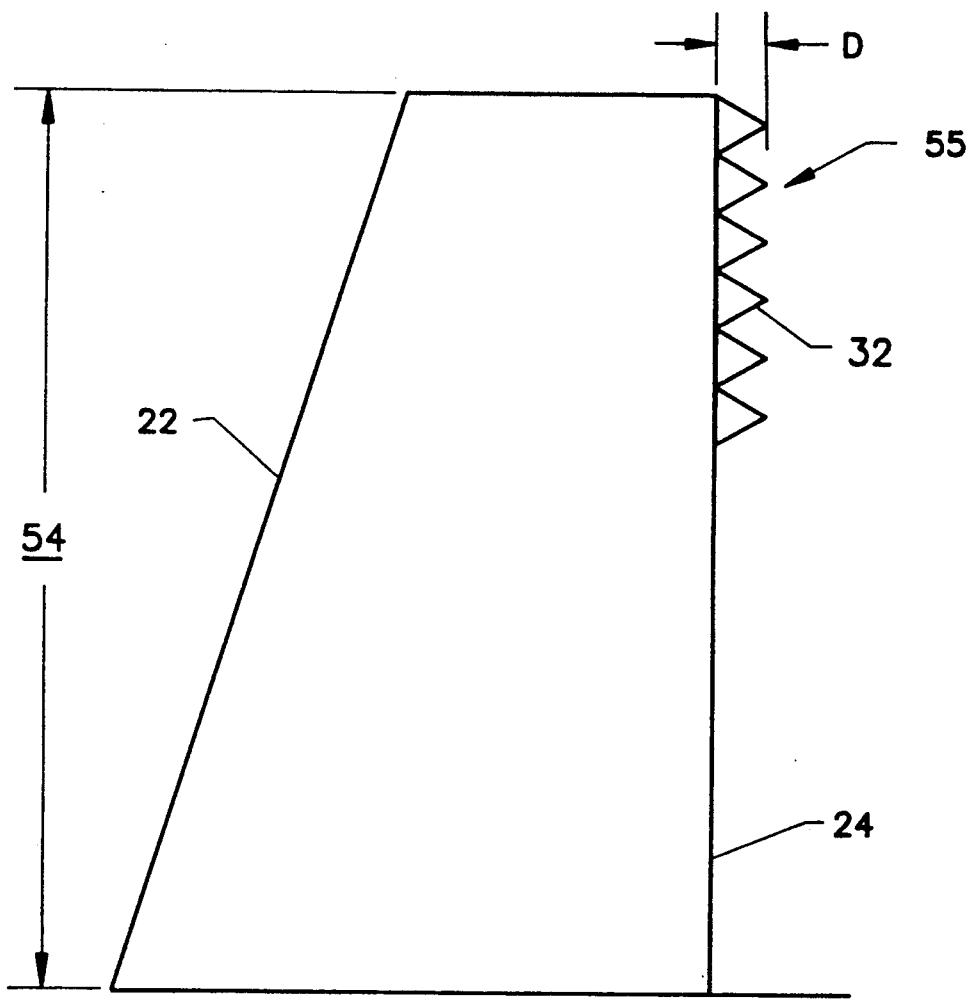
FIGS. 15 and 16 are views of the wing with serrations extending only partically across the full span of the wing.
Figure 16:
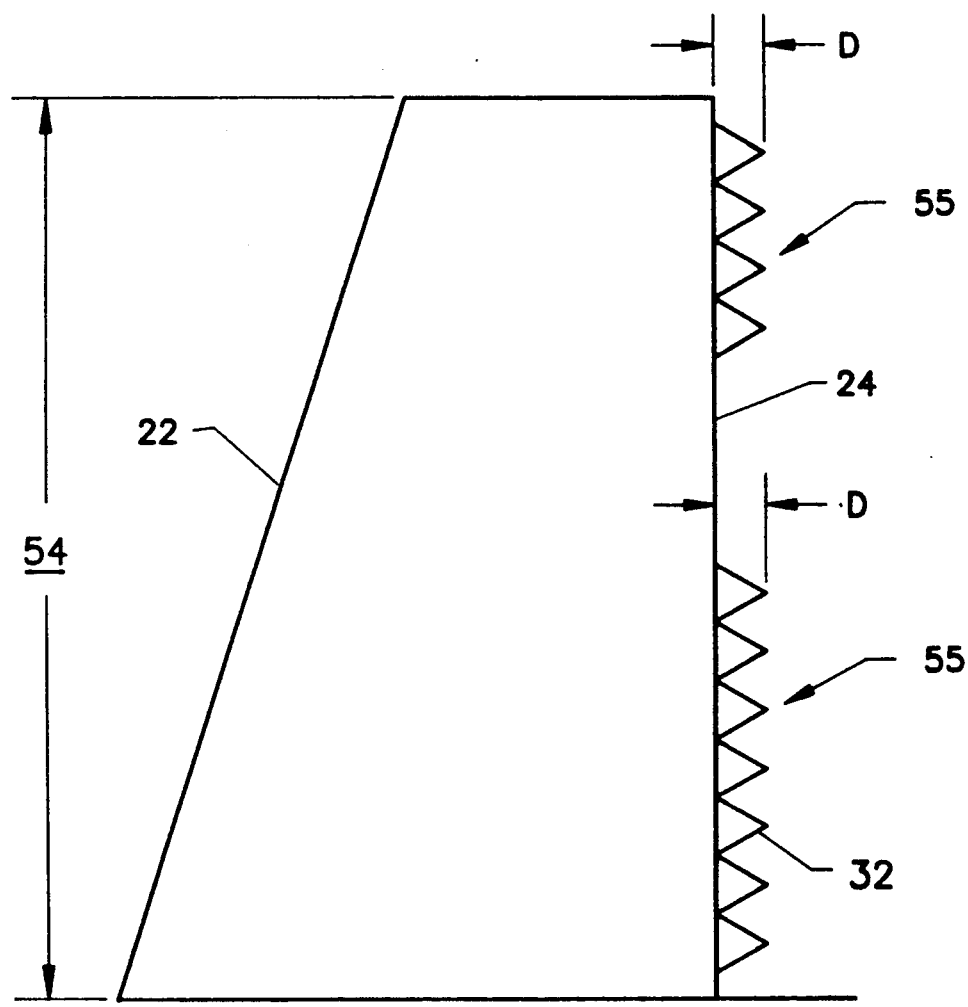

In a preferred embodiment, the serrations extend evenly over full span 54, and are symmetrically shaped. This embodiment is generally illustrated in FIG. 14. Although the serrated panels can be applied over the full span, they can also be provided partially along the span. See FIGS. 15 and 16. Shortened panels 55 of periodic indentions 32 can be placed anywhere along full length 54 of the wing span, depending on the aerodynamic or geometric scales of the wing. Moreover, although the saw teeth illustrated in FIGS. 2 and 3 and symmetrically shaped with the serratia cut at 60° included angles, other possible embodiments are illustrated in the other drawings. For example, in FIG. 4, more or less acute angles are illustrated for the saw teeth. Moreover, the shape of the saw teeth may vary along the length of the trailing edge depending on various airfoil parameters. Thus, the geometric depth of the serrated panel, referred to by the letter "D" in the Figures, defined as the normal distance between the vertex and the base of each serration, as well as planform shape and thickness, are determined by characteristic geometric or aerodynamic scales. Geometric scales include, but are not limited to, local wing or wing-flap chord, wing or wing-flap trailing-edge thickness, local wing or flap section thickness ratio, span and aspect ratio of the wing or wing flap, and local sweep angle of leading and trailing edge of the wing or flap.

Aerodynamic scales include, but are not limited to, displacement or momentum thickness of the wake near the trailing edge of the lifting surface, displacement or momentum thicknesses of the boundary layer on the upper and lower surface of the lifting surface, vorticity scales and the vertical distribution of vorticity in the trailing-edge wake, location of the onset of the wake on the lifting surface, and the Mach number and Reynolds number describing the flow field over the wing.

Figure 4:
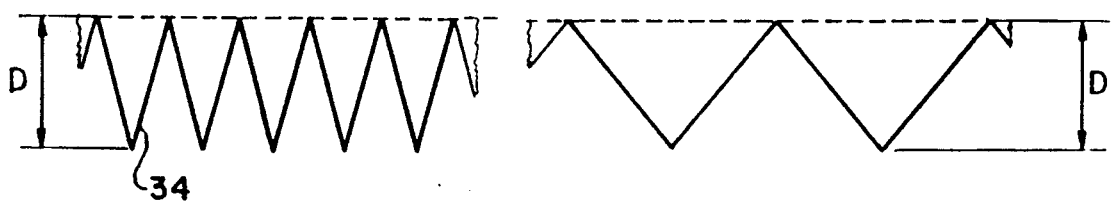
FIG. 4 is a schematic view showing a variation of shape for the serrations used on the serreted panel attached to the trailing edge illustrated in FIG. 2.

As shown in FIG. 4, the depth, planform shape and thickness of the serratia can vary in the span-wise direction as a function of the wing planform shape, wing twist distribution, and wing-tip shape.

As an example of an application of scaling criteria for serrated trailing edges, experimentally derived aerodynamic scaling criteria were considered for planar and perpendicular serratia. In the example, an unswept wing with an aspect ratio of 11 and a Raynolds number of 1,000,000 (based on the average wing chord and the freestream velocity) was considered in incompressible flow conditions. The depth "D" of the undeflected, planar serrations was determined as a function of the calculated thickness or calculated displacement thickness of the wake near the trailing edge of the basic wing. For angles of incidence of 0° to 4°, the wake thickness, $\delta_{TE}$, is 0.080 c, where c is the local wing chord, and the wake-displacement thickness, $\delta^*_{TE}$ is 0.020 c. In the example considered, boundary-layer transition was fixed at 0.05 c on the upper and lower surface of the wing. The aerodynamic scaling criterion for the depth, D, of the aligned symmetric saw tooth serrated panel was given as $D = 2.0 \times \delta^*_{TE}$ or $D = 0.5 \times \delta_{TE}$. Hence, $D = 0.040$ c for the planar serration.

The depth of perpendicular serratia for the same wing configuration was determined as a function of the calculated thickness, $\delta_{1sTE}$, or displacement thickness, $\delta^*_{1sTE}$ of the trubulent boundary layer along the lower surface (pressure side) of the airfoil. The astimated boundary-thickness, $\delta_{1sTE}$ is approximately 0.01200 c, while the displacement thickness, $\delta_{1sTE}$, is 0.0030 c in cruise and climb conditions for the wing presently considered. Accordingly, the scaling criterion for the depth D is $D=6\times\delta^*_{1sTE}$ or $D=1.5\times\delta^*_{1sTE}$ for the wing; D is equal to 0.018 c for the perpendicular serration.

Figure 5:
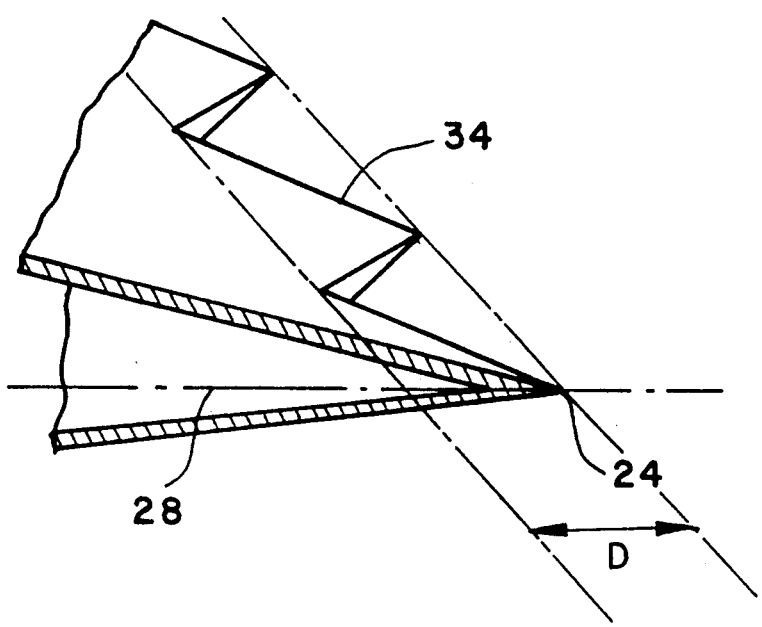
FIG. 5 is a schematic, cross-sectional view of a second, preferred embodiment of the present invention, showing serrations formed in the trailing edge of an airfoil.

In another embodiment illustrated in FIG. 5, the serratia 34 are integrally formed in the trailing edge 24, and thus, separate connecting means are not required.

Figure 6:
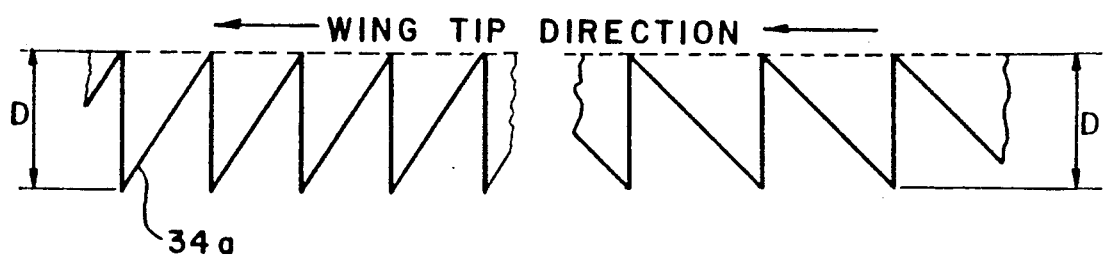
FIG. 6 is a schematic view showing an asymmetric configuration of saw teeth, as variation of either of the embodiments of FIGS. 2 or 5.

FIGS. 6-9 refer to various other shapes of serrations. FIG. 6 refers to right-angled serrations 34a which may vary in their direction relative to the wing tip direction so as to point either inboard or outboard. In this embodiment, as well as the other embodiments of FIGS. 7-9, the entire trailing edge may be provided with serrations equidistantly spaced along the trailing edge, or incompletely along the trailing edge. Also, the size and shape of the serrations may be consistent throughout the length of the trailing edge, or they may be varied according to aerodynamic and geometric parameters of the airfoil.

Figure 7:
FIG. 7 is a schematic view of another variation of serrations used in either of the FIG. 2 or FIG. 5 embodiments.
Figure 17:
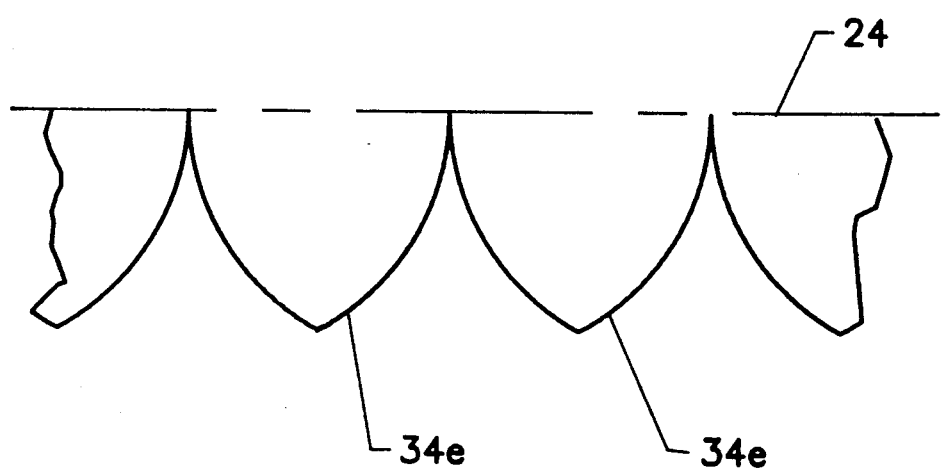

The serratia 34b illustrated in FIG. 7 are a concave semi-circular shape and may likewise be provided symmetrically along the length of the trailing edge, or asymmetrically in which differing radii of curvature for the scalloped portiopns may be used, as shown be FIG. 17, where serrations 34e have one radius of curvature for the right side of the convex portions and another radius for the left side.

Figure 8:
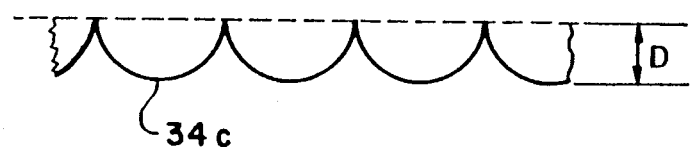
FIG. 8 is another variation of serrations used in either of the FIG. 2 or FIG. 5 embodiments.
Figure 9:
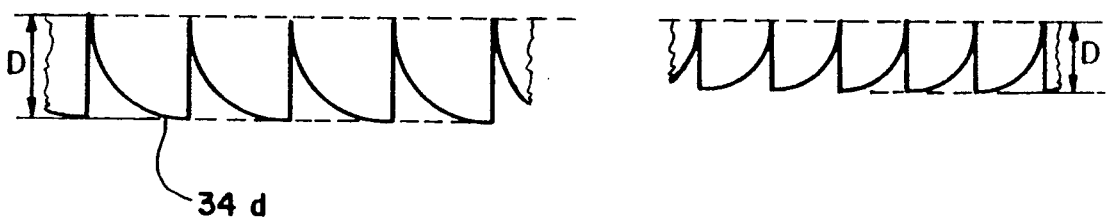
FIGS. 9 and 17 are other variations of asymmetric serrations used in either of the FIG. 2 or FIG. 5 embodiments.

FIG. 8 illustrates another variation in which the convex serratia 34c are scolloped shaped, while FIG. 9 illustrates convex serratia 34d which are quarter-circular in shape.

In all of the above-described embodiments, the serrated panel 30 may be thin (less than 0.1% of the airfoil chord), while the edges of the serratia can be untapered or untapered to sharp edges.

Figure 10:
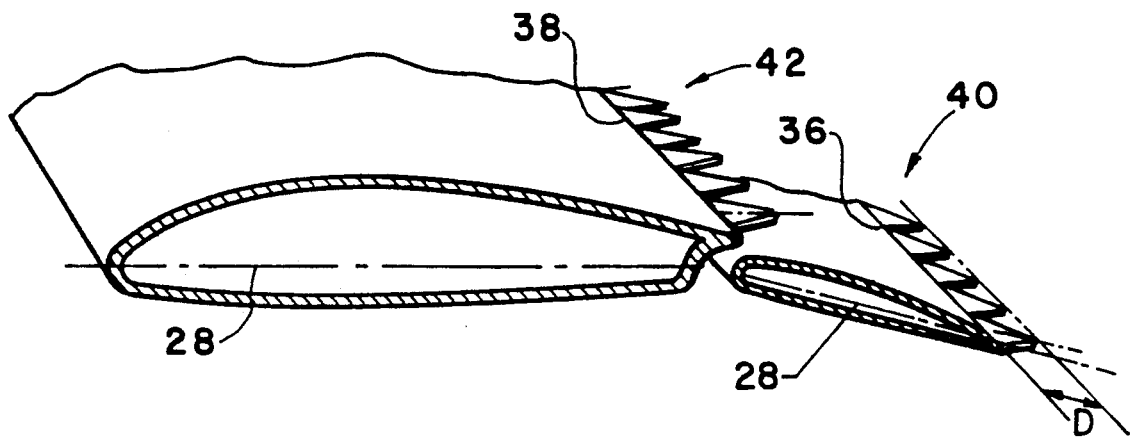
FIG. 10 is a schematic, cross-sectional view of a third, perferred embodiment of the present invention.

FIG. 10 refers to another embodiment of the present invention in which the serratia are provided on a wing-flap triling edge 36 as well as a flap-slot trailing edge 38. A first serrated panel 40 has a plurality of span-wise, periodic indentations which form the plurality of serratia which may take any of these shapes described above. The panel 40 is connected to the wing-flap trailing edge 36. A second serrated panel 42 is connected to the flap-slot trailing edge 38. The connections may be fixed or pivotal and may be in the form of any suitable connecting means. As previously mentioned, the connecting means can be further connected to actuators of any suitable type, such as push-pull cables, hydraulic controls etc.

Figure 11:
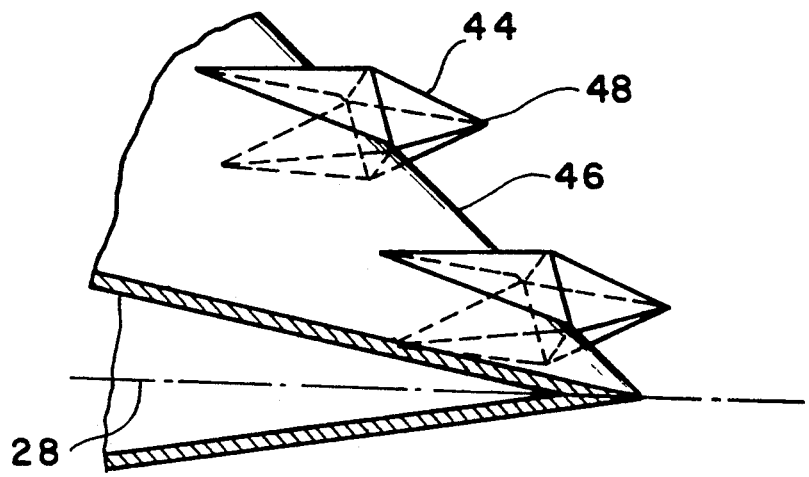
FIGS. 11 and 12 are schematic, cross-sectional views of two different variations of a fourth, preferred embodiment of the present invention.
Figure 12:
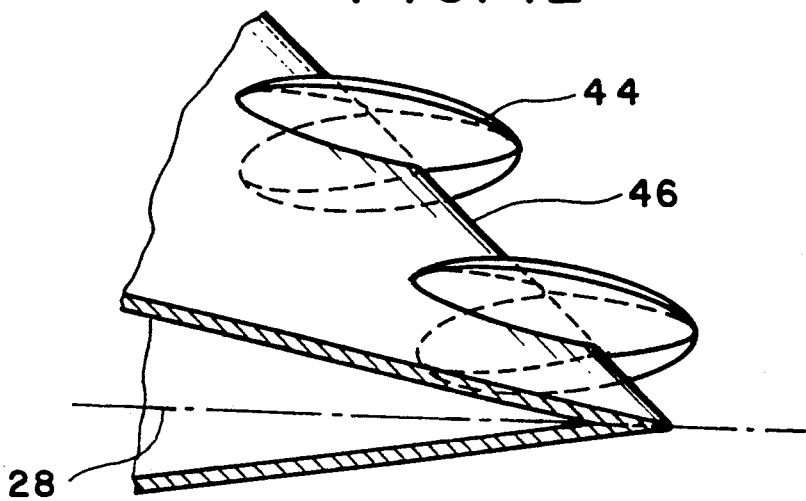

In the embodiments of FIGS. 11 and 12, the serratia are not formed in the trailing efcge or on separately attached panels, but instead, the serratia are a plurality of separately attachable pods 44 which are attached to the trailing edge 46 at small intervals along the trailing edge (only two are illustrated in each of FIGS. 11 and 12). Again, any suitable connecting means can be used, such as rivots, welding, etc. The pods may have a polyhedron shape as illustrated in FIG. 11, in which the vertex 48 of each pod 44 is substantially coplanar with the chord 28. In the embodiment of FIG. 12, the pods 44 are curved, three-dimensional objects which overhang the trailing edge 46. In either of the embodiments of FIGS. 11 and 12, the pods 44 may be split along a longitudinal, horizontal plane of symmetry and disposed on opposite sides of the airfoil, juxtaposed over each other, to form the pod-body with the trailing edge portion of the wing sandwiched therebetween. This enables the pods to be streamlined and thus prevents from the adding unacceptable levels of drag.

Installed on the sharp or moderately blunt trailing edges of aerodynamic or hydrodynamic lifting surfaces, the serrated panels described herein provide reduced drag and increased lifting capabilities of the lifting surfaces throughout the entire angle of attack range, without significant penalties in added weight or construction cost. No new manufacturing technology is required for production and installation of the serrated trailing edge panels.

The many features and advantages of the present invention are apparent from the details of the specification, and thus, it is intended by the appended claims to cover all such features and advantages of the serrated panel which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and spirit of the invention.

What is claimed is:

1. An apparatus for improving lift and drag characteristics of a lifting surface in a fluid flow having a span, a leading edge, a trailing edge, and a chord, comprising:

a serrated panel having an upper and a lower surface and a plurality of span-wise, periodic indentations; and a pivotal connecting means for connecting the serrated panel to the trailing edge of the lifting surface such that the serrated panel extends from the trailing edge into the fluid flow and both the upper and lower surfaces of the serrated indentations remain in contact with the fluid.

2. An apparatus according to claim 1, wherein the serrated panel has a range of pivotal movement of substantially 90°.

3. An apparatus according to claim 2, wherein the serrated panel is adjustably positioned coplanar with the chord at low angles of attack for drag reduction, deflected relative to the chord for increased lift and decreased drag at relatively low to moderate angles of attack, and deflected perpendicularly downward relative to the chord for maximum lift.

4. An apparatus for improving lift and drag characteristics of a lifting surface having a span, a leading edge, a trailing edge, and a chord, comprising:

a serrated panel having a plurality of span-wise, periodic indentions, wherein the indentations extend over a full length of the span; and a pivotal connecting means for connecting the serrated panel to the trailing edge of the lifting surface.

5. An apparatus for improving lift and drag characteristics of a lifting surface in a fluid flow having a span, a leading edge, a trailing edge, and a chord, comprising:

a serrated panel having an upper and a lower surface and a plurality of span-wise, periodic indentions; and means for connecting the serrated panel to the trailing edge of the lifting surface such that the serrated panel extends from the trailing edge into the fluid flow and both the upper and lower surface of the serrated indentions remain in contact with the fluid;

wherein the indentions extend over a partial length of the span.

6. An apparatus for improving lift and drag characteristics of a lifting surface in a fluid flow having a span, a leading edge, a trailing edge, and a chord, comprising:

a serrated panel having an upper and a lower surface and a plurality of span-wise, periodic indentions; and means for connecting the serrated panel to the trailing edge of the lifting surface such that the serrated panel extends from the trailing edge into the fluid flow and both the upper and lower surfaces of the serrated indentions remain in contact with the fluid;

wherein the indentions have a saw-tooth configuration forming a plurality of serrations.

7. An apparatus according to claim 6, wherein the plurality of serrations are formed by adjacent teeth at 60° included angles.

8. An apparatus for improving lift and drag characteristics of a lifting surface in a fluid flow having a span, a leading edge, a trailing edge, and a chord, comprising:

a serrated panel having an upper and a lower surface and a plurality of span-wise, periodic indentions; and means for connecting the serrated panel to the trailing edge of the lifting surface such that the serrated panel extends from the trailing edge into the fluid flow and both the upper and lower surfaces of the serrated indentions remain in contact with the fluid;

wherein the plurality of indentions have a thickness less than or equal to about 0.1% of the chord.

9. An apparatus for improving lift and drag characteristics of a lifting surface having a span, a leading edge, a trailing edge, and a chord, comprising:

a serrated panel having a plurality of span-wise, periodic indentions;

means for connecting the serrated panel to the trailing edge of the lifting surface;

wherein the indentions have a saw-tooth configuration forming a plurality of serrations; and wherein the serrations have a depth, shape and thickness which varies over the span of the lifting surface.

10. An apparatus for improving lift and drag characteristics of a lifting surface having a span, a leading edge, a trailing edge, and a chord, comprising:

a serrated panel having a plurality of span-wise, periodic indentions, wherein the indentions are a continuous series of concave or convex circular projections; and a pivotal connecting means for connecting the serrated panel to the trailing edge of the lifting surface.

11. An apparatus according to claim 10, wherein the serrations are symmetrically disposed along the trailing edge.

12. An apparatus according to claim 10, wherein the serrations are asymmetrically disposed along the trailing edge.

13. An apparatus according to claim 10, wherein the serrations are semi-circularly shaped.

14. An apparatus according to claim 10, wherein the serrations are quarter-circularly shaped.

15. An apparatus for improving lift and drag characteristics of a lifting surface having a span, a wing-flap trailing edge, and a flap-slot trailing edge, comprising:

a first serrated panel having a plurality of span-wise, periodic indentations;

first connecting means for connecting the first serrated panel to the wing-flap trailing edge;

a second serrated panel having a plurality of span-wise, period indentations; and second connecting means for connecting the second serrated panel to the flap-slot trailing edge.

16. A lift generating member according to claim 15, wherein the serrations are integrally formed in the trailing edge.

17. An apparatus according to claim 15, wherein the wing flap trailing edge is located ahead of the lifting surface.

18. A member for generating lift in a fluid flow comprising:

a leading edge;

a trailing edge;

a lifting surface between the leading edge and the trailing edge; and a plurality of serrations formed at the trailing edge such that the serrations extend from the trailing edge into the fluid flow and all surfaces of the serrations remain in contact with the fluid.

19. An apparatus for improving lift and drag characteristics of a lifting surface having a span, a leading edge, a trailing edge, and a chord, comprising:

a serrated panel having a plurality of span-wise, periodic indentions; wherein the serrated panel is rigidly connected to the trailing edge of the lifting surface at a fixed position between a coplanar and perpendicular orientation; and wherein the indentions are continuous series of concave or convex circular projections.

* * * * *